United States Patent [19]
Carey et al.

[11] Patent Number: 6,021,758
[45] Date of Patent: Feb. 8, 2000

[54] METHOD AND APPARATUS FOR ENGINE CYLINDER BALANCING USING SENSED ENGINE SPEED

[75] Inventors: David M. Carey; Taner Tuken, both of Columbus, Ind.

[73] Assignee: Cummins Engine Company, Inc., Columbus, Ind.

[21] Appl. No.: 08/979,054

[22] Filed: Nov. 26, 1997

[51] Int. Cl.[7] .................................................. F02M 51/00
[52] U.S. Cl. ...................................... 123/436; 123/406.24
[58] Field of Search .............................. 123/436, 406.24; 73/117.3

[56] References Cited

U.S. PATENT DOCUMENTS

| | | | |
|---|---|---|---|
| 5,200,899 | 4/1993 | Ribbens et al. | 73/117.3 |
| 5,239,473 | 8/1993 | Ribbens et al. | 73/117.3 |
| 5,278,760 | 1/1994 | Ribbens et al. | 123/436 |
| 5,495,415 | 2/1996 | Ribbens et al. | 123/436 |
| 5,576,963 | 11/1996 | Ribbens et al. | 123/436 |

*Primary Examiner*—Erick R. Solis
*Attorney, Agent, or Firm*—Woodard, Emhardt, Naughton Moriarty & McNett Patent and Trademark Attorneys

[57] ABSTRACT

Manufacturing/design imperfections and component failures in the fuel system/engine can lead to non-uniform torque production among the cylinders. Non-uniform cylinder torques can be observed as small engine speed fluctuations about the average engine speed at any given operating point. Severe imbalance conditions can be heard, felt, and seen by human operators. The present invention uses the fluctuations in engine speed to detect an unbalanced engine and attempts to correct the unbalance by applying trims to the fueling commands for each individual cylinder. The present invention is based on the calculation of a 6-point Fourier Transform (FFT) of engine speed data over one complete engine cycle. This FFT is calculated continuously to provide imbalance detection. An unbalanced engine results in non-zero magnitudes of the FFT components that correspond to the 0.5, 1.0, and 1.5 engine orders. The compensation scheme of the present invention uses iteration to drive the magnitudes of these components to zero if the engine is detected to be unbalanced.

28 Claims, 6 Drawing Sheets

0.5 order: single cylinder imbalances (primarily)

1.0 order: bank-bank symmetric imbalances 1.5 order: bank-bank offsets

METHOD AND APPARATUS FOR ENGINE CYLINDER BALANCING USING SENSED ENGINE SPEED

TECHNICAL FIELD OF THE INVENTION

The present invention generally relates to engine control systems and, more particularly, to a method and apparatus for engine cylinder balancing using sensed engine speed.

BACKGROUND OF THE INVENTION

In a multi-cylinder reciprocating internal combustion engine, there are differences in the amount of useful torque produced by each cylinder, even during normal operation. Small between-cylinder torque differences can cause rough idling and poor emissions performance. Large between-cylinder differences can cause extremely rough operation and may indicate faulty cylinder and/or fuel injection components. The process of sensing these torque differences and using the information for compensation or diagnosis of engine operation is known as cylinder balancing.

Most present day electronically controlled engines include some form of interrupt-based engine speed sensing mechanism, which allows measurement of engine speed at very short intervals. Although there have been prior art systems which infer engine torque changes from this data in order to balance cylinder output power, they have generally proven to be unsatisfactory. There is therefore a need for a method and apparatus for engine cylinder balancing using sensed engine speed which allows real time control of cylinder fueling in order to continuously balance engine cylinder power contribution. The present invention is directed toward meeting this need.

SUMMARY OF THE INVENTION

Manufacturing/design imperfections and component failures in the fuel system/engine can lead to non-uniform torque production among the cylinders. Non-uniform cylinder torques can be observed as small engine speed fluctuations about the average engine speed at any given operating point. Severe imbalance conditions can be heard, felt, and seen by human operators. The present invention uses the fluctuations in engine speed to detect an unbalanced engine and attempts to correct the imbalance by applying trims to the fueling commands for each individual cylinder. The present invention is based on the calculation of a 6-point Fourier Transform (FFT) of engine speed data over one complete engine cycle. This FFT is calculated continuously to provide imbalance detection. An unbalanced engine results in non-zero magnitudes of the FFT components that correspond to the 0.5, 1.0, and 1.5 engine orders. The compensation scheme of the present invention uses iteration to drive the magnitudes of these components to zero if the engine is detected to be unbalanced.

In one form of the invention, a method for engine cylinder balancing is disclosed, comprising the steps of: a) sensing a speed of the engine a plurality of times during a time period; b) performing a Fourier Transform upon the sensed engine speed, thereby producing at least one Fourier Transform component corresponding to an engine order of the engine; c) determining a cylinder imbalance condition from a phase of the Fourier Transform component; and d) applying a predetermined adjustment to a fueling command of the engine, wherein the predetermined adjustment is selected based upon the determination made at step (c).

In another form of the invention a method for engine cylinder balancing is disclosed, comprising the steps of: a) sensing a speed of the engine a plurality of times during a time period; b) performing a Fourier Transform upon the sensed engine speed, thereby producing at least first, second and third Fourier Transform Components corresponding respectively to 0.5, 1.0 and 1.5 engine orders of the engine; c) determining a single cylinder imbalance condition of the engine from a phase of the first Fourier Transform component; d) applying a first predetermined adjustment to a fueling command of the engine based upon the determination made at step (c), wherein the first predetermined adjustment is selected to reduce an absolute value of the first Fourier Transform component; e) determining bank-to-bank symmetric imbalances of the engine from a phase of the second Fourier Transform component; f) applying a second predetermined adjustment to the fueling command of the engine based upon the determination made at step (e), wherein the second predetermined adjustment is selected to reduce an absolute value of the second Fourier Transform component; g) determining bank-to-bank offset imbalances of the engine; and h) applying a third predetermined adjustment to the fueling command of the engine based upon the determination made at step (g), wherein the third predetermined adjustment is selected to reduce an absolute value of the third Fourier Transform component.

In another form of the invention, a system for engine cylinder balancing is disclosed, comprising: a) means for sensing a speed of the engine a plurality of times during a time period; b) means for performing a Fourier Transform upon the sensed engine speed, thereby producing at least one Fourier Transform component corresponding to an engine order of the engine; c) means for determining a cylinder imbalance condition from a phase of the Fourier Transform component; and d) means for applying a predetermined adjustment to a fueling command of the engine, wherein the predetermined adjustment is selected based upon the determination made at step (c).

In another form of the invention, a system for engine cylinder balancing is disclosed, comprising: means for sensing a speed of the engine a plurality of times during a time period; means for performing a Fourier Transform upon the sensed engine speed, thereby producing at least first, second and third Fourier Transform Components corresponding respectively to 0.5, 1.0 and 1.5 engine orders of the engine; first means for determining a single cylinder imbalance condition of the engine from a phase of the first Fourier Transform component; means for applying a first predetermined adjustment to a fueling command of the engine based upon the determination made by the first means for determining, wherein the first predetermined adjustment is selected to reduce an absolute value of the first Fourier Transform component; second means for determining bank-to-bank symmetric imbalances of the engine from a phase of the second Fourier Transform component; means for applying a second predetermined adjustment to the fueling command of the engine based upon the determination made by the second means for determining, wherein the second predetermined adjustment is selected to reduce an absolute value of the second Fourier Transform component; third means for determining bank-to-bank offset imbalances of the engine from a phase of the third Fourier Transform component; and means for applying a third predetermined adjustment to the fueling command of the engine based upon the determination made by the third means for determining, wherein the third predetermined adjustment is selected to reduce an absolute value of the third Fourier Transform component.

DETAILED DESCRIPTION OF THE PREFERRED EMBODIMENT

Figure 2:
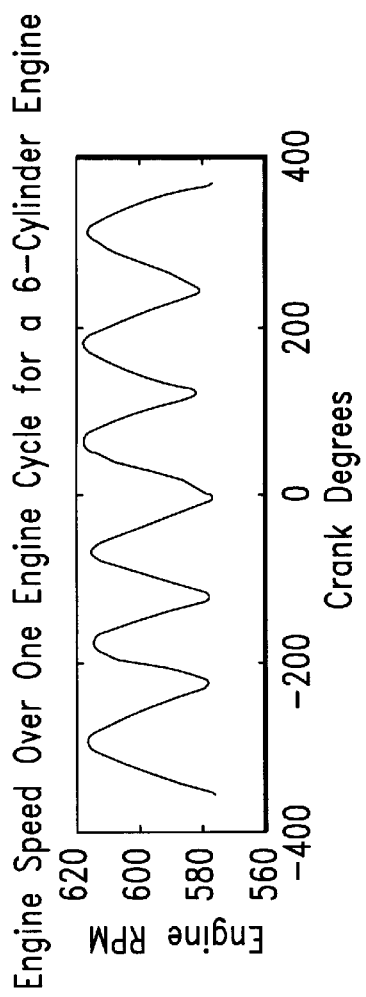
FIG. 2 is a graph of engine speed versus crankshaft degrees over one engine cycle for a 6-cylinder engine.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
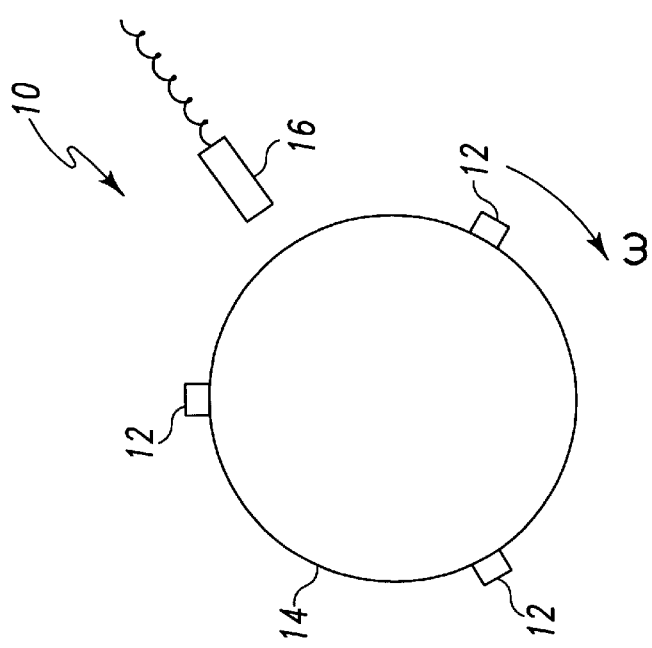
FIG. 1 is a schematic diagram of a prior art engine speed sensor.

The present invention utilizes the detection of non-uniform cylinder torques as small observed engine speed fluctuations about the average engine speed for any given operating point of the engine. Therefore, the method and apparatus of the present invention requires the sensing of engine speed by any convenient means. FIG. 1 illustrates a typical prior art engine speed sensor, indicated generally at 10. Ferrous targets 12 are placed at fixed angular positions upon a rotating shaft 14, such as a crankshaft or camshaft, which rotates at a fixed relative speed to the engine speed. An appropriate sensor 16, such as a Hall effect sensor, is placed so as to sense the passing of each of the targets 12 and to generate an output signal in response thereto. This output signal is generally applied as an interrupt to a microprocessor such that the microprocessor can measure the time delay between successive outputs from the sensor 16 (and therefore also successive passings of the targets 12). Those having ordinary skill in the art will recognize that the engine speed sensor 10 is illustrated by way of example only, and that there are many different known methods for measuring engine speed.

FIG. 2 illustrates a graph of engine speed (in revolutions per minute) versus crankshaft position (in degrees) for a six-cylinder engine over one complete engine cycle. It can be seen that the actual instantaneous speed of the engine varies significantly from its average speed as each of the engine cylinders fires in turn (the peaks of the graph represent successive firings of the engine cylinders). It can additionally be seen that the peaks do not all lie at the same value, indicating different power contributions from each cylinder as it fires. A cylinder having a greater power contribution will increase the engine speed to a higher level than the firing of cylinders having a lower power contribution.

Figure 3:
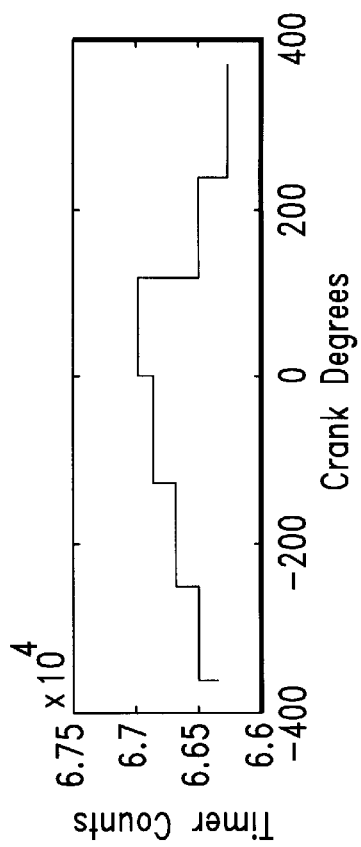
FIG. 3 is a graph of timer counts versus crankshaft degrees for the speed sensor illustrated in FIG. 1.

In a preferred embodiment of the present invention, the output of the sensor 16 of FIG. 1 is coupled to an interrupt input port of an engine control module (ECM) microprocessor (not shown). It will be appreciated by those having ordinary skill in the art that nearly all modern engines incorporate a microprocessor-based ECM in order to manage various engine functions. It is intended that the process of the present invention be implemented as software code stored in a memory associated with such ECM microprocessor, the software code being executed by the microprocessor as described herein. Therefore, each time one of the targets 12 passes the sensor 16, an interrupt signal is generated to the ECM microprocessor. The microprocessor operates a timer which measures the time between the passing of successive targets 12 past the sensor 16. FIG. 3 illustrates a graph of these timer counts versus crank degrees for one complete engine cycle of a six-cylinder engine. It can be seen that, because of the speed fluctuations of the engine, a different number of timer counts is accumulated between each of the successive activations of the sensor 16. The data in FIG. 3 can be converted to "pseudo-acceleration" values by calculating the difference between the time delay between successive pairs of sensor 16 activations. Therefore, it will be necessary to have seven successive datapoints from the graph of FIG. 3 in order to calculate six pseudo-acceleration values for one complete engine cycle of a six-cylinder engine.

Once the six successive pseudo-acceleration values have been determined, the present invention comprehends the use of a six-point Fourier Transform (FFT), using the engine crank angle as the independent variable, in order to relate the data to engine order (although other methods of calculating the Fourier Transform are also comprehended by the present invention). It is theoretically possible to calculate the cylinder power contribution of a six-cylinder engine from the first three engine orders (0.5, 1.0, and 1.5 engine orders). The calculation involves six unknowns (the relative power of each cylinder) and six equations (using the magnitude and phase of the first three engine orders). The closed-form solution to these equations tends to be ill-conditioned, therefore the present invention utilizes iteration in order to converge upon a solution. The use of iteration is less computationally intensive and is inherently stable with a properly designed algorithm. Once the FFT calculation has been completed, the process of the present invention calculates the trims to be applied to the fuel injection system for each cylinder in order to drive the FFT components to zero. When all FFT components are zero, the power contribution of the engine cylinders is equally balanced.

Figure 4A:
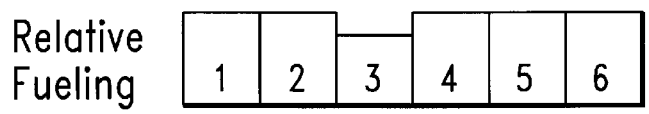
FIGS. 4A–C schematically illustrate the relative fueling to engine cylinders producing 0.5 order, 1.0 order, and 1.5 order engine imbalances, respectively.
Figure 4B:
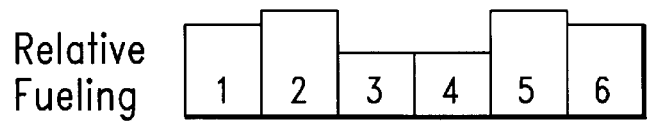
Figure 4C:
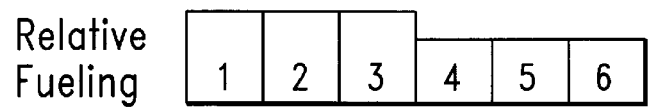

Referring now to FIGS. 4A–C, there is schematically illustrated the relationship between each of the first three engine orders and common cylinder imbalance conditions which increase the magnitude of these orders in the FFT results. As shown in FIG. 4A, contribution to the 0.5 order is primarily from single cylinder imbalances, wherein the relative fueling to a single cylinder is different than the relative fueling to the remaining cylinders, thereby causing the under- or over-fueled cylinder to produce substantially different power than the remaining cylinders. FIG. 4B illustrates cylinder bank-to-cylinder bank symmetric imbalances which contribute primarily to the 1.0 order. Finally, FIG. 4C illustrates cylinder bank-to-cylinder bank offsets, in which one bank of cylinders has substantially different fueling from the other cylinder bank, which contributes primarily to the magnitude of the 1.5 order.

Figure 5A:
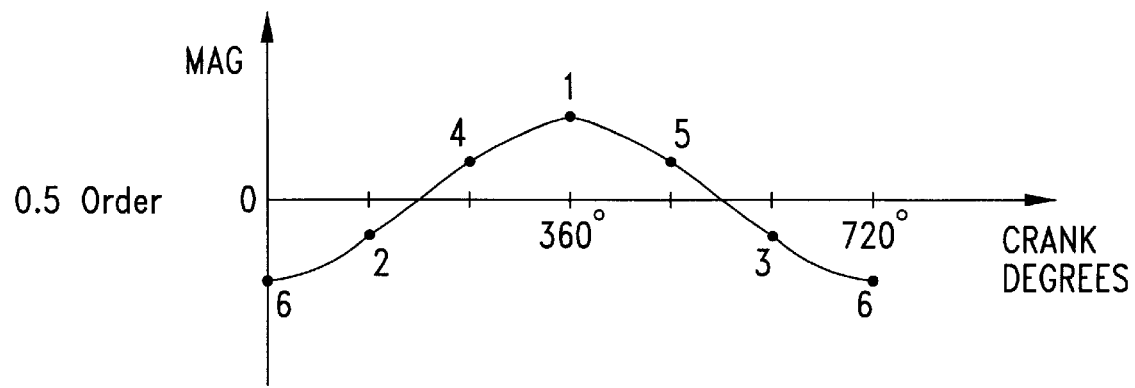
FIGS. 5A–C are graphs of the magnitude versus phase of the first three components of a Fourier Transform of engine speed data.
Figure 5B:
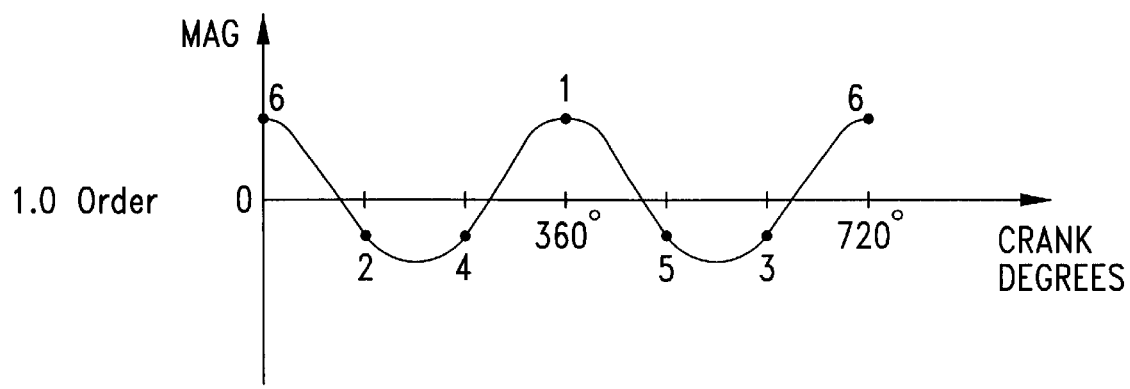
Figure 5C:
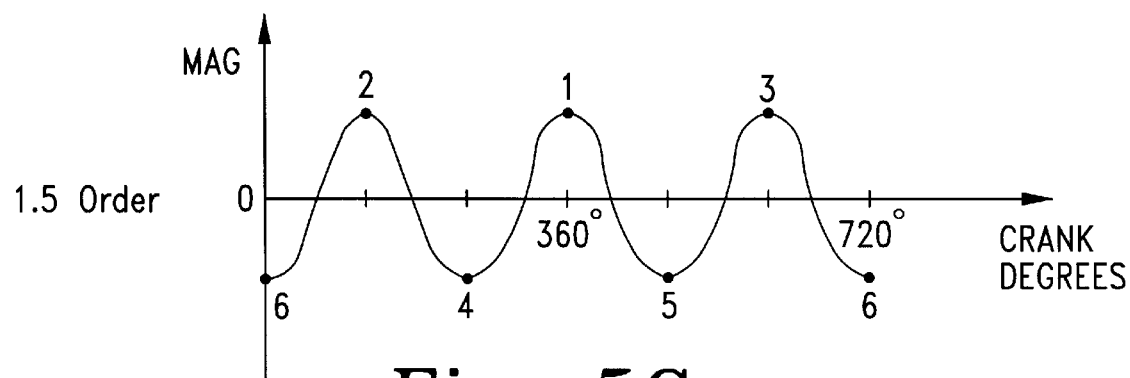

FIGS. 5A–C illustrate the general shape of the FFT data for each of the first three engine orders. As seen in FIG. 5A, the 0.5 engine order results in a cosine wave having a period of 720 crank degrees. The 1.0 zero engine order illustrated in FIG. 5B is also a cosine wave, having a period of 360 degrees. Finally, the 1.5 engine order illustrated in FIG. 5C is a cosine wave having a period of 240 crank degrees.

In the standard six-cylinder engine, the cylinder firing order is 1, 5, 3, 6, 2, 4. Each of the data points in the graphs of FIGS. 5A–C have been labeled to indicate which cylinder is firing at the time the data in the graph was produced. It will be readily apparent to those having ordinary skill in the art that the graph of FIG. 5A illustrates the 0.5 order component of the FFT when cylinder No. 1 is high (higher than average output power for all the cylinders) or when cylinder 6 is low (lower than average output power for all the cylinders). The phase of the waveform in FIG. 5A would be translated to the left or the right if another engine cylinder were high or low. For example, the peak in the waveform of FIG. 5A would occur at 240 degrees of crank angle if cylinder No. 4 were high or cylinder No. 3 were low. By observing the 0.5 order component of the FFT, therefore, one can determine if a single cylinder imbalance is occurring within the engine. A substantially flat waveform for the 0.5 order component of the FFT indicates that no substantial single cylinder imbalances are occurring within the engine. As described hereinbelow, the present invention therefore applies correction to the fueling commands to the engine in order to iteratively drive the 0.5 order component of the FFT to zero in order to achieve a balanced condition.

Similarly, the presence of a 1.0 order component in the FFT, as illustrated in FIG. 5B, indicates that a pair of cylinders on opposite banks of the engine are either high or low. For example, the waveform of FIG. 5B indicates that the No. 1 and No. 6 cylinders of the engine are both high with respect to the average power produced by all of the engine cylinders. As described hereinabove with respect to FIG. 5A, the phase of the waveform shown in FIG. 5B will be translated to the left or to the right when other pairs of cylinders are either high or low. The present invention is therefore operative to make changes in the fueling command to the engine in order to iteratively drive the waveform of FIG. 5B to zero.

Finally, FIG. 5C illustrates the 1.5 order FFT component, indicating bank-to-bank offsets in the engine. The waveform illustrated in FIG. 5C indicates that cylinders 1, 2, and 3 are high, while cylinders 4, 5, and 6 are low. The opposite condition in the engine (cylinders 4, 5, and 6 high and cylinders 1, 2, and 3 low) will produce a 120 degree phase shift in the waveform of FIG. 5C. Once again, the presence of a 1.5 order component in the FFT data will cause the present invention to adjust the fueling commands to the engine in order to iteratively drive the 1.5 order component of the FFT to zero.

Once the first three engine order components of the FFT have been determined, the present invention then utilizes this information in order to determine the fueling corrections to be applied to the fuel system for each engine cylinder. We may therefore define a 1×6 matrix for the fueling corrections for a 6-cylinder engine as follows:

[a b c d e f]

where
 a is fueling correction for cylinder 1
 b is fueling correction for cylinder 2
 c is fueling correction for cylinder 3
 d is fueling correction for cylinder 4
 e is fueling correction for cylinder 5
 f is fueling correction for cylinder 6

With reference to FIG. 5A, it can be seen that in order to correct the 0.5 order component when cylinder No. 1 is high, it will be necessary to reduce the fueling to cylinder No. 1 by a relatively great amount, increase the fueling for cylinder No. 6 by relatively great amount, reduce the fueling to cylinders 4 and 5 by a relatively smaller amount, and increase the fueling to cylinders 2 and 3 by a relatively smaller amount. These changes to the fueling of the cylinders will have a tendency to flatten out the waveform of FIG. 5A. Likewise, FIG. 5B indicates that the fueling to cylinders 1 and 6 should be reduced by a relatively greater amount, while the fueling to FIGS. 2, 3, 4, and 5 should be increased by a relatively smaller amount. Again, this will have the tendency to flatten out the waveform of FIG. 5B. Finally, FIG. 5C indicates that the fueling to cylinders 1, 2, and 3 should be reduced by the same amount that the fueling to cylinders 4, 5, and 6 are increased. These changes to the fueling for the situations indicated in FIGS. 5A–6 may be expressed in matrix form as follows:

0.5 order, cylinder 1 high: k[−2 1 1 −1 −1 2]
 1.0 order, cylinder 1, 6 high: k[−2 1 1 1 1 −2]
 1.5 order, cylinder 1, 2, 3 high: k[−1 −1 −1 1 1 1]

where
 k is an empirically determined constant.

While k is empirically determined for each engine and fuel system, the present inventors have found that the following value for k generally works for most 6-cylinder heavy-duty engines when adjustments are performed five times per second:

$$k = \frac{.16 \, \text{mm}^3 / \text{stroke}}{\text{adjustment}}$$

It may be preferable to use a lower value while the engine is idling, such as 12–15 mm³/stroke.

It will be appreciated that the summation of the corrections detailed above is as follows:

k[−5 1 1 1 1 1]

Note that after the corrections are applied, the overall engine power is unchanged, as the sum of the corrections adds up to zero for all cylinders. Furthermore, the correction applied for each engine order produces an effect only for that engine order; if an FFT is applied to the correction, the resultant components will be zero for the other engine orders. It will therefore be appreciated that the above-described process allows correction of different engine orders independently.

In light of the above, it can then be seen that the following matrices may be used to correct any combination of engine cylinder power imbalance in a 6-cylinder engine:

Base Trim Adjustments for 0.5 Order Component:
 Cyl#1 high or Cyl#6 low: [−2 1 1 −1 −1 2]
 Cyl#2 high or Cyl#5 low: [1 −2 1 −1 2 −1]
 Cyl#3 high or Cyl#4 low: [1 1 −2 2 −1 −1]
 Cyl#4 high or Cyl#3 low: [−1 −1 2 −2 1 1]
 Cyl#5 high or Cyl#2 low: [−1 2 −1 1 −2 1]
 Cyl#6 high or Cyl#1 low: [2 −1 −1 1 1 −2]

Base Trim Adjustments for 1.0 Order Component:
 Cyl#1, 6 high: [−2 1 1 1 1 −2]
 Cyl#2, 5 high: [1 −2 1 1 −2 1]
 Cyl#3, 4 high: [1 1 −2 −2 1 1]
 Cyl#3, 4 low: [−1 −1 2 2 −1 −1]
 Cyl#2, 5 low: [−1 2 −1 −1 2 −1]
 Cyl#1, 6 low: [2 −1 −1 −1 −1 2]

Base Trim Adjustments for 1.5 Order Component:
Cyl#1,2,3, high: [−1 −1 −1 1 1 1]
Cyl#4,5,6, high: [1 1 1 −1 −1 −1]

Figure 6:
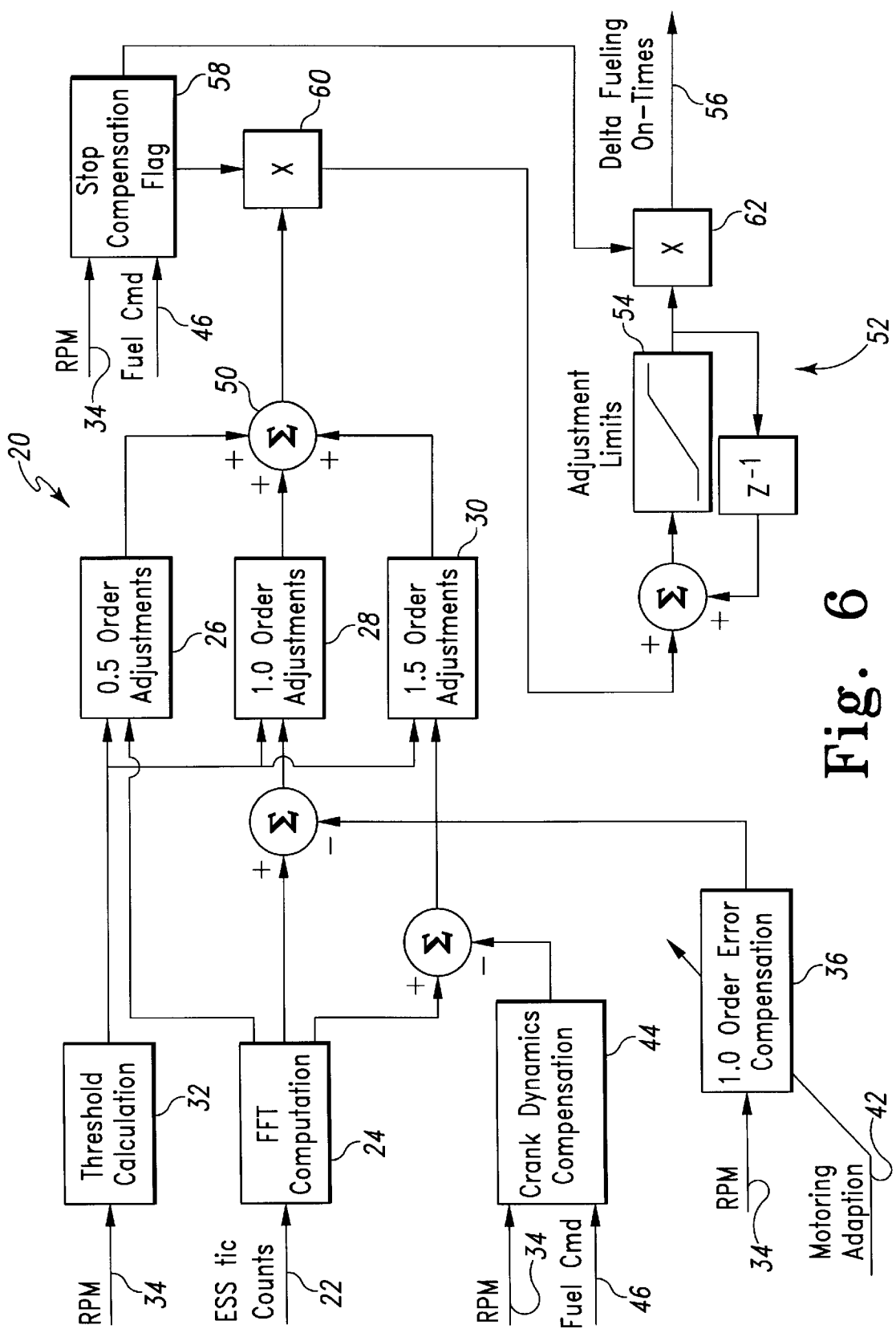
FIG. 6 is a schematic block diagram of a preferred embodiment of the present invention.

A preferred embodiment process of the present invention for effecting the above-described fuel system corrections based upon an FFT computation of the engine speed data is illustrated schematically in FIG. 6 and indicated generally at 20. It will be appreciated by those having ordinary skill in the art that the preferred embodiment process 20 is preferably executed by a microprocessor-based ECM having access to the described input variables and additionally having the ability to control fueling to the individual cylinders, such as by having control over the on-times for each of the cylinder fuel injectors. The timer counts of the engine speed data, as described hereinabove with respect to FIG. 3, are input to the process at 22. The block 24 performs the FFT computation upon this engine speed data, and provides the resultant 0.5 order component to the block 26, the resultant 1.0 order component to the block 28, and the resultant 1.5 order component to the block 30. The fuel system adjustments described hereinabove for each of the first three engine orders are determined at blocks 26–30, depending upon the results of the FFT computation performed at block 24.

An optional feature of the present invention is the threshold calculation performed at block 32, using the input 34 representative of the engine RPM. It may be found desirable to only correct the fueling commands when the FFT magnitude for a particular order is above a predetermined limit, this limit being dependent upon the engine speed 34. The threshold calculation 32 is therefore preferably a one-dimensional look-up table which provides the FFT component thresholds to the blocks 26–30, dependent upon the current engine speed 34. The data in this look-up table may be empirically determined.

Figure 7:
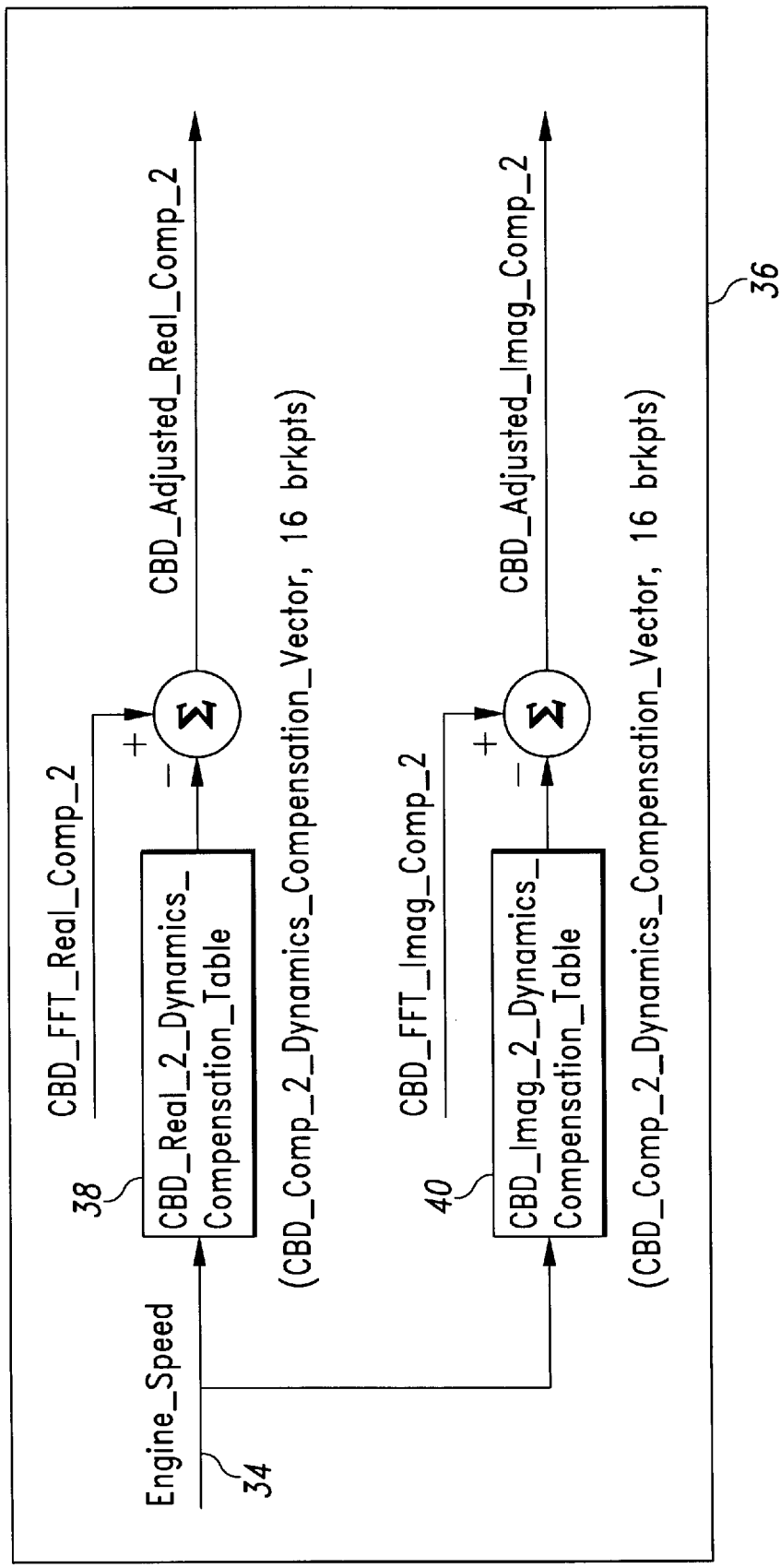
FIG. 7 is a schematic block diagram of a 1.0 order error compensation of the present invention.

Another optional feature of the process 20 is the block 36 which adjusts the 1.0 order component of the FFT for tooth errors in the engine speed sensor 10 and for reciprocating inertia effects of the engine. It has been found that the reciprocating masses of the engine lead to 1.0 order imbalances and that these effects are speed-dependent. Therefore, the block 36 includes the engine speed input 34 thereto. As shown in greater detail in FIG. 7, the adjustment to the 1.0 order FFT component (both real and imaginary) is found from a pair of one-dimensional look-up tables 38 and 40 (for the real part and for the imaginary part, respectively) which are functions of the engine speed 34.

The compensation tables 38 and 40 are adaptively determined as the process 20 executes. When the engine is motoring (i.e., when there is no fueling to the engine), then there can be no fueling induced imbalance in the engine. Therefore, any imbalance exhibited when the engine is motoring is due to tooth placement error in the speed sensor and/or the reciprocating masses of the engine. An input 42 to the block 36 identifies when the engine is motoring, and the tables 38 and 40 are updated (using an appropriate filter constant) in order to store the 1.0 order effect due to tooth placement error and reciprocating masses for any particular engine speed. The data thus stored into the look-up tables 38 and 40 is then used as a correction factor to the real and imaginary portions of the 1.0 order FFT component when performing the compensation of block 36.

Figure 8:
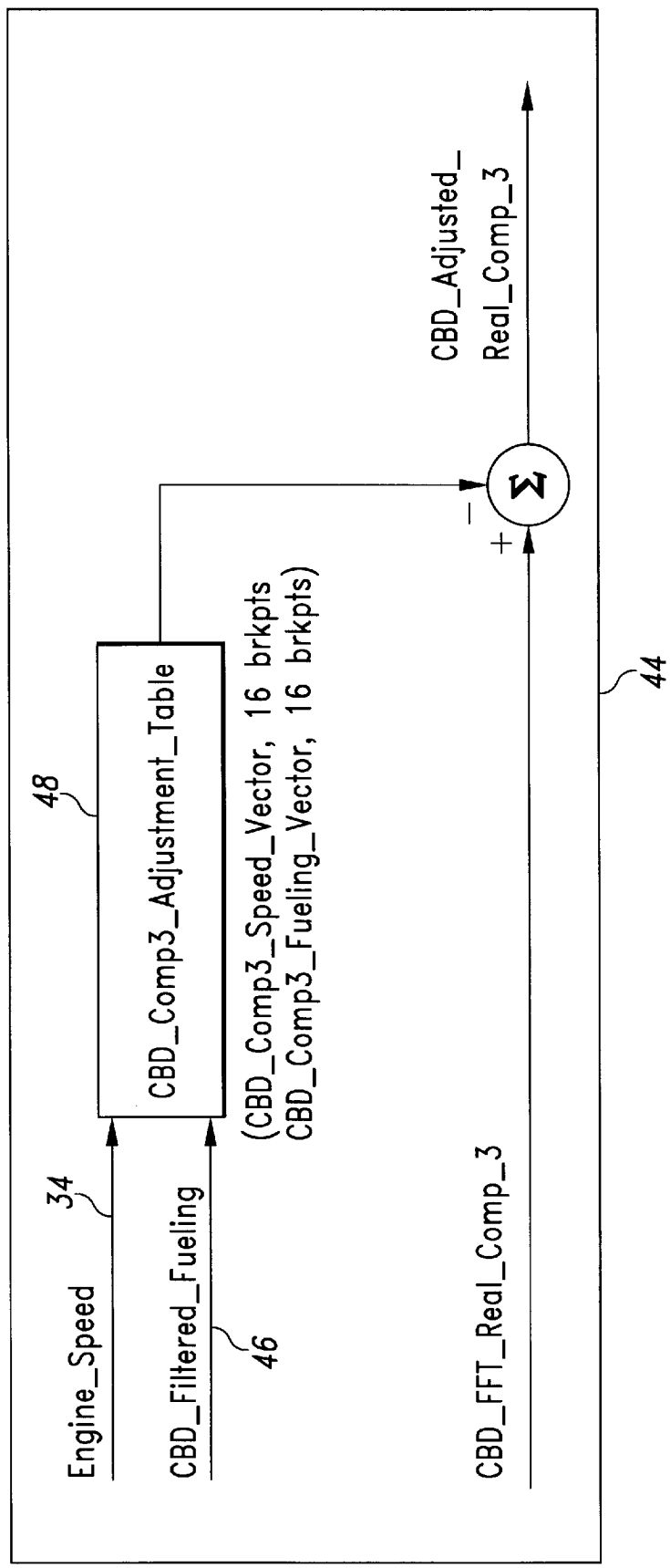
FIG. 8 is a schematic block diagram of a crankshaft dynamic compensation of the present invention.

Another optional feature of the process 20 comprises an adjustment of the 1.5 order component of the FFT in order to compensate for engine crankshaft dynamic effects. These are naturally occurring 1.5 order components that occur even when the cylinders are completely balanced. This compensation is performed at block 44. As illustrated in FIG. 8, the compensation of block 44 is performed by entering the engine speed 34 and a filtered actual fueling command 46 into a two-dimensional look-up table 48. The look-up table 48 is determined empirically by measuring the 1.5 order components of the FFT when no correction is being done to the fueling. The table 48 therefore includes the 1.5 order contribution for any given combination of engine speed and fueling command. This 1.5 order contribution is subtracted from the 1.5 order component (real portion only; the imaginary portion of the 1.5 order component is always zero).

After the blocks 26–30 have selected fuel command adjustments based upon the FFT components (as optionally compensated by the blocks 36 and 44), these fueling command adjustments are summed at 50 into an aggregate adjustment. This aggregate adjustment is applied to a first order filter 52 which includes an adjustment limiting block 54 which limits the total amount of adjustment which can be applied to the cylinder fueling commands. Such limits are desirable in situations such as a dead engine cylinder, in which its performance cannot be improved no matter how much the fueling command is changed. The filtered fueling adjustment thus produced is output from the process 20 on the output line 56.

The process 20 further includes an optional stop compensation block 58 which is able to turn off the process 20 when certain conditions exist. For example, there is no need to adjust the cylinder fueling commands when the engine is operating in a motoring condition (no fueling commands to the cylinders), when the engine brakes are applied, etc. Therefore, one of the inputs to the stop compensation block 58 is the fueling command 46. Also, it may be desirable to disable the process 20 when the engine is operating in a high RPM condition. At high speeds, the Δ times between successive tooth 12 sensings become smaller, therefore, the resolution in the engine speed input data becomes smaller and therefore less reliable. Additionally, at high speeds, the sensor wheel 14 has a tendency to translate as well as rotate, thereby further corrupting the engine speed data. The engine speed 34 is therefore also an input to the stop compensation block 58, in order to allow the process 20 to be disabled at high speeds. The stop compensation block 58 is implemented as a two-dimensional look-up table which contains values of 1 and 0 (nominally). A value of 1 for any RPM/fuel command condition means that active cylinder balancing is enabled for the process 20, while a value of 0 means the active cylinder balancing will be paused. The value determined by the look-up table at block 58 is applied to the multipliers 60 and 62 in order to achieve the desired effect.

The output 56 is utilized by the ECM to adjust the fueling command to each cylinder, wherein this fueling command is produced by the normal fueling algorithm being executed concurrently by the ECM. In a preferred embodiment, the entire algorithm 20 is executed once every 200 msec. by the ECM. This enables the fueling adjustments to iteratively converge upon a fueling command which results in substantially zero FFT components for the 0.5, 1.0 and 1.5 engine orders. The result is substantially evenly balanced output power from each cylinder of the engine.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, while the present invention has been described hereinabove with respect to a 6-cylinder engine, those having ordinary skill in the art will recognize that the processes described hereinabove are equally applicable to engines having fewer or greater number of cylinders.

What is claimed is:

1. A method for engine cylinder balancing, comprising the steps of:
   a) sensing a speed of the engine a plurality of times during a time period;
   b) performing a Fourier Transform upon the sensed engine speed, thereby producing at least one Fourier Transform component corresponding to an engine order of the engine;
   c) determining a cylinder imbalance condition from a phase of the Fourier Transform component; and
   d) applying a predetermined adjustment to a fueling command of the engine, wherein the predetermined adjustment is selected based upon the determination made at step (c).

2. The method of claim 1, wherein step (a) further comprises sensing the engine speed a plurality of times during 720 degrees of rotation of a crankshaft of the engine.

3. The method of claim 1, wherein step (a) further comprises sensing the engine speed with a Hall effect sensor.

4. The method of claim 1, wherein step (b) further comprises performing a Fast Fourier Transform upon the sensed engine speed.

5. The method of claim 1, wherein step (b) further comprises performing a Fourier Transform upon the sensed engine speed, thereby producing Fourier Transform components corresponding to 0.5, 1.0 and 1.5 engine orders of the engine.

6. The method of claim 5, wherein step (c) further comprises determining single cylinder imbalances from the 0.5 engine order component, determining bank-to-bank symmetric imbalances from the 1.0 engine order component, and determining bank-to-bank offset imbalances from the 1.5 engine order component.

7. The method of claim 1, wherein step (d) further comprises the step of applying a plurality of predetermined adjustments to a fueling command for a respective plurality of engine cylinders.

8. The method of claim 6, further comprising the step of:
   e) correcting the 1.0 engine order component for non-fueling induced imbalances in the engine prior to performing step (d).

9. The method of claim 6, further comprising the step of:
   e) correcting the 1.5 engine order component for naturally occurring 1.5 engine order contributions in the engine prior to performing step (d).

10. The method of claim 1, further comprising the step of:
    e) preventing step (d) from being performed if the fueling command is commanding no fueling of the engine.

11. The method of claim 1, further comprising the step of:
    e) preventing step (d) from being performed if the engine speed exceeds a predetermined threshold.

12. A method for engine cylinder balancing, comprising the steps of:
    a) sensing a speed of the engine a plurality of times during a time period;
    b) performing a Fourier Transform upon the sensed engine speed, thereby producing at least first, second and third Fourier Transform Components corresponding respectively to 0.5, 1.0 and 1.5 engine orders of the engine;
    c) determining a single cylinder imbalance condition of the engine from a phase of the first Fourier Transform component;
    d) applying a first predetermined adjustment to a fueling command of the engine based upon the determination made at step (c), wherein the first predetermined adjustment is selected to reduce an absolute value of the first Fourier Transform component;
    e) determining bank-to-bank symmetric imbalances of the engine from a phase of the second Fourier Transform component;
    f) applying a second predetermined adjustment to the fueling command of the engine based upon the determination made at step (e), wherein the second predetermined adjustment is selected to reduce an absolute value of the second Fourier Transform component;
    g) determining bank-to-bank offset imbalances of the engine from a phase of the third Fourier Transform component; and
    h) applying a third predetermined adjustment to the fueling command of the engine based upon the determination made at step (g), wherein the third predetermined adjustment is selected to reduce an absolute value of the third Fourier Transform component.

13. The method of claim 12, wherein the first predetermined adjustment has substantially no effect on the second and third Fourier Transform components, wherein the second predetermined adjustment has substantially no effect on the first and third Fourier Transform components, and wherein the third predetermined adjustment has substantially no effect on the first and second Fourier Transform components.

14. The method of claim 12, wherein the first, second and third predetermined adjustments produce substantially no change to the total amount of fuel delivered to the engine.

15. A system for engine cylinder balancing, comprising:
    means for sensing a speed of the engine a plurality of times during a time period;
    means for performing a Fourier Transform upon the sensed engine speed, thereby producing at least one Fourier Transform component corresponding to an engine order of the engine;
    means for determining a cylinder imbalance condition from a phase of the Fourier Transform component; and
    means for applying a predetermined adjustment to a fueling command of the engine, wherein the predetermined adjustment is selected based upon the determination made by the means for determining.

16. The system of claim 15, wherein the means for sensing comprises means for sensing the engine speed a plurality of times during 720 degrees of rotation of a crankshaft of the engine.

17. The system of claim 15, wherein the means for sensing comprises a Hall effect sensor.

18. The system of claim 15, wherein the means for performing comprises means for performing a Fast Fourier Transform upon the sensed engine speed.

19. The system of claim 15, wherein the means for performing comprises means for performing a Fourier Transform upon the sensed engine speed, thereby producing Fourier Transform components corresponding to 0.5, 1.0 and 1.5 engine orders of the engine.

20. The system of claim 19, wherein the means for determining comprises means for determining single cylinder imbalances from the 0.5 engine order component, determining bank-to-bank symmetric imbalances for the 1.0 engine order component, and determining bank-to-bank offset imbalances from the 1.5 engine order component.

21. The system of claim 15, wherein the means for applying comprises means for applying a plurality of predetermined adjustments to a fueling command for a respective plurality of engine cylinders.

22. The system of claim 20, further comprising means for correcting the 1.0 engine order component for naturally occurring 1.5 engine order contributions in the engine.

23. The system of claim 20, further comprising means for correcting the 1.5 engine order component for non-fueling induced imbalances in the engine.

24. The system of claim 15, further comprising means for disabling the means for applying if the fueling command is commanding no fueling of the engine.

25. The system of claim 15, further comprising means for disabling the means for applying if the engine speed exceeds a predetermined threshold.

26. A system for engine cylinder balancing, comprising:
means for sensing a speed of the engine a plurality of times during a time period;
means for performing a Fourier Transform upon the sensed engine speed, thereby producing at least first, second and third Fourier Transform Components corresponding respectively to 0.5, 1.0 and 1.5 engine orders of the engine;
first means for determining a single cylinder imbalance condition of the engine from a phase of the first Fourier Transform component;
means for applying a first predetermined adjustment to a fueling command of the engine based upon the determination made by the first means for determining, wherein the first predetermined adjustment is selected to reduce an absolute value of the first Fourier Transform component;
second means for determining bank-to-bank symmetric imbalances of the engine from a phase of the second Fourier Transform component;
means for applying a second predetermined adjustment to the fueling command of the engine based upon the determination made by the second means for determining, wherein the second predetermined adjustment is selected to reduce an absolute value of the second Fourier Transform component;
third means for determining bank-to-bank offset imbalances of the engine from a phase of the third Fourier Transform component; and
means for applying a third predetermined adjustment to the fueling command of the engine based upon the determination made by the third means for determining, wherein the third predetermined adjustment is selected to reduce an absolute value of the third Fourier Transform component.

27. The system of claim 26, wherein the first predetermined adjustment has substantially no effect on the second and third Fourier Transform components, wherein the second predetermined adjustment has substantially no effect on the first and third Fourier Transform components, and wherein the third predetermined adjustment has substantially no effect on the first and second Fourier Transform components.

28. The system of claim 26, wherein the first, second and third predetermined adjustments produce substantially no change to the total amount of fuel delivered to the engine.

* * * * *

UNITED STATES PATENT AND TRADEMARK OFFICE
CERTIFICATE OF CORRECTION

PATENT NO : 6,021,758
DATED : February 8, 2000
INVENTOR(S) : David M. Carey et al.

It is certified that error appears in the above-identified patent and that said Letters Patent is hereby corrected as shown below:

In the Abstract, line 9, please delete "unbalance" and insert in lieu thereof --imbalance--.

Column 5, please insert a space after line 64 and before line 65.

Column 8, line 34, please delete "A" before "times" and insert in lieu thereof --Δ--.

Signed and Sealed this

Ninth Day of January, 2001

Attest:

Q. TODD DICKINSON

*Attesting Officer*    *Commissioner of Patents and Trademarks*